C. I. HALL.
TALKING MACHINE.
APPLICATION FILED MAY 15, 1915.
1,240,711.
Patented Sept. 18, 1917.
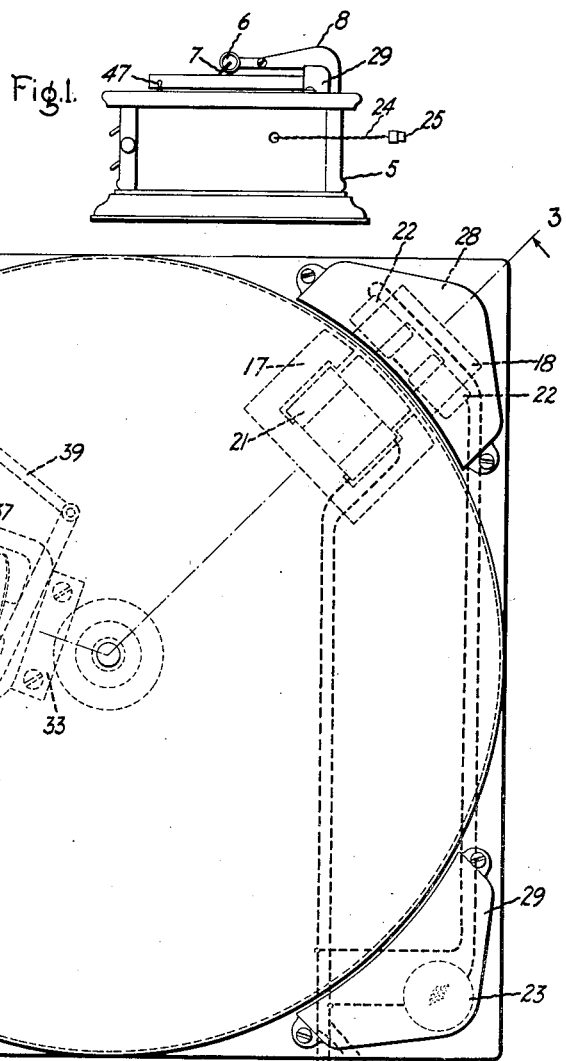
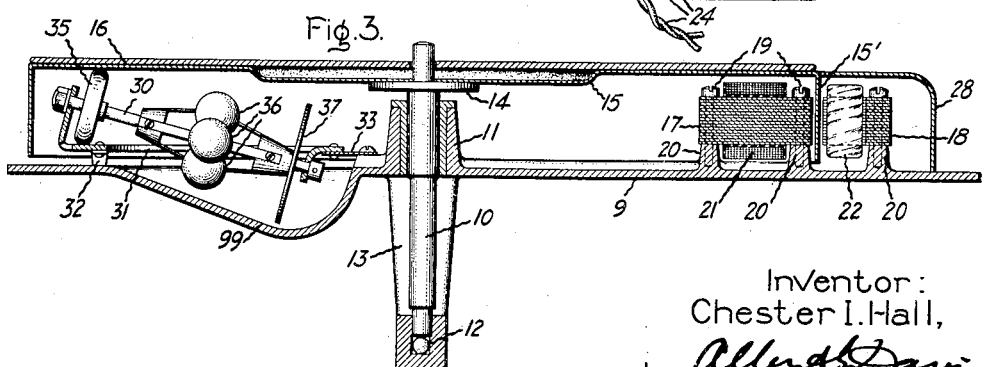
Inventor:
Chester I. Hall,
by Allen S. Davis
His Attorney.

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

TALKING-MACHINE.

1,240,711.     Specification of Letters Patent.     Patented Sept. 18, 1917.

Application filed May 15, 1915. Serial No. 28,319.

*To all whom it may concern:*

Be it known that I, CHESTER I. HALL, a citizen of the United States, residing at Fort Wayne, county of Allen, State of Indiana, have invented certain new and useful Improvements in Talking-Machines, of which the following is a specification.

My invention relates to talking machines of the disk type and its object is to provide a novel form of electric drive for such machines. Considered in its broadest aspect my invention comprises a rotatable circular member for supporting a disk record and an electric motor so arranged that its driving force is applied to the outer periphery of the member. More specifically the invention comprises a rotatable disk-supporting member from whose periphery depends a rim of conducting material which is adapted to act as the armature of an alternating current induction motor of the induction meter type. The invention further comprises certain other novel and improved features of general application to talking machines.

The novel features which I believe to be patentably characteristic of my invention are definitely indicated in the claims appended hereto. The construction of an electrically operated talking machine embodying the novel features of my invention and the mode of operation thereof will be understood from the following description taken in connection with the accompanying drawings, in which:

Figure 1 is an elevation of a talking machine embodying my invention; Fig. 2 is a plan view of the motor board and operating mechanism mounted thereon; and Fig. 3 is a sectional elevation along the line 3—3 of Fig. 2.

The cabinet 5, sound box 6, stylus 7 and supporting arm 8 are of standard design. Within the cabinet is suitably mounted a motor plate 9. The motor plate is preferably formed of cast iron, but it will of course be understood that any other suitable construction may be equally well employed. A vertically positioned shaft 10 is journaled in a boss 11 of the motor plate and is supported by a step bearing 12 in the lower end of a bracket 13 extending downwardly from the motor plate.

A disk or plate 14 is secured near the upper end of the shaft 10 and supports a cup-shaped member 15 of electrical conducting material, such as aluminum, copper or the like. The member 15 has a flat circular upper surface designed to operatively support a disk record, and to this end is covered with the usual layer 16 of felt, velvet or similar material. The edge or rim of the cup-shaped member 15 is a continuous band 15' of electrical conducting material and depends from the periphery of the circular surface of the member. The shaft 10 and cup-shaped member 15 constitute the rotatable member of the machine, and are driven in the manner now to be described.

In one corner of the motor plate 9 is mounted the magnetic core member of an electric motor of the induction motor type provided with two exciting windings carrying currents which are displaced in phase relatively to one another. In the drawings, I have illustrated this core member as consisting of two parts 17 and 18 arranged with an air gap therebetween. The cup-shaped member 15 is arranged so that its depending band 15' is adapted to rotate through this air gap. The core parts 17 and 18 are made up of bundles of laminated magnetic material secured by screws 19 to bosses 20 extending upwardly from the motor plate 9. In order to secure the necessary phase displacement, the winding on one of the core parts, as for example the core part 17, is preferably given a higher inductance by providing the core with three parallel legs, as in the type of induction motor now commonly employed in induction watthour meters. Upon the middle leg of the core part 17 is mounted the exciting or energizing coil 21. A large portion of the flux set up by the coil 21 passes through the approximately closed magnetic circuits in the core part 17 and does not pass across the air gap, whereby the coil 21 has relatively high inductance. The core part 18 is generally U-shaped and carries an exciting or energizing coil 22 on each leg thereof. Substantially all the flux set up by the coils 22 passes across the air gap between the core parts 17 and 18, and the coils 22 thus have relatively low inductance compared with the coil 21. The coil 22 is, furthermore, connected in series with an incandescent lamp 23 positioned in another corner of the motor plate 9. The resistance of the lamp 23 is substantially non-inductive, and is relatively much larger than the resistance of the coils 22, so that when the coil 21 is connected to an alternating current circuit, such as an ordinary alternating current lighting circuit, and the coils 22 with their associated lamp are connected in parallel therewith, there will be a sufficient phase displacement between the currents flowing in the two circuits to cause the disk to be rotated in a simple and highly efficient manner.

The coil 21 is designed to be connected directly across a suitable source of alternating current energy and the coils 22 with the series-connected lamp 23 are similarly designed to be so connected. To this end the coils and lamp are connected to lead wires 24, as indicated by the heavy dotted lines in Fig. 2 of the drawings. The lead wires, as illustrated, are of the twisted cord type and extend from a suitable opening in the cabinet 5, and are provided with a standard plug 25 for insertion in an ordinary electric lamp socket.

The core part 17 and energizing coil 21 are positioned beneath the cup-shaped member 15 and are therefore covered by such member. The core part 18 and energizing coils 22 are provided with a cover 28 screwed to the motor plate 9. The lamp 23 is provided with a similar cover 29. The dimensions of the lamp cover 29 are so proportioned that light from the lamp sweeps over the top of the rotatable member, whereby illumination is obtained for changing records and needles.

It will be well understood by those skilled in the art that the electromagnetic means including the magnetic core member and energizing coils produces a shifting magnetic field across the air gap between the core parts 17 and 18. The depending band 15' of the cup-shaped member is arranged to rotate in this air gap. The shifting magnetic field sets up induced currents in the conducting material of the member 15, and causes the member to rotate in the well understood manner. It will thus be seen that the magnetic core member and energizing coils coöperate with the cup-shaped member of electrical conducting material to form an electric motor of the induction motor type.

A speed governor of the centrifugal friction type is mounted on the motor plate 9 beneath the cup-shaped member. This governor is driven directly from the cup-shaped member by friction, thereby eliminating any noise otherwise occasioned by gearing. The shaft 30 of the governor is mounted on a frame 31 supported upon the motor plate by means of springs 32 and 33. The motor plate is recessed at 99 for the suitable accommodation of the governor parts. A wheel 35 is secured to the shaft 30 and has a peripheral surface of felt or similar material. The periphery of the wheel is in engagement with the lower face of the cup-shaped member 15. The resilient tendency of the springs 32 and 33 presses the wheel upwardly and insures a good friction driving contact between the wheel and the cup-shaped member.

Centrifugal governor balls 36 are operatively mounted on the shaft 30, and are arranged to move a friction disk 37 along the shaft in response to changes in speed of the rotatable member of the machine. A friction pad 38 is operatively related to the friction disk 37, and is adapted to be moved with respect to the disk by means of a linkage or lever mechanism 39. The friction between the disk 37 and the pad 38 has a braking action upon the rotatable member and operates to maintain substantially constant any desired operating speed of the member. The lever mechanism 39 is adapted to be operated by a handle 40. A pointer 41 coöperates with a scale 42 to indicate the speed which the friction pad is adjusted to maintain approximately constant. As will be observed from Fig. 2 of the drawings, the handle 40, pointer 41 and scale 42 are positioned in the third corner of the motor plate 9. The lever mechanism and governor constitute a speed changing device, since the lever mechanism moves the friction pad 38 toward or away from the friction disk 37 to vary the position at which the governor balls begin to act.

Rotation of the rotatable member of the machine is prevented by a brake 45. This brake comprises friction pads 46 adapted to bear against the inner surface of the depending band of the cup-shaped member and an operating handle 47. The operating handle 47 is located in the fourth corner of the plate 9. The energizing coils of the electromagnetic motive means are in circuit during the entire time of the operation of the machine, and rotation of the rotatable member is interrupted for the purpose of changing records, needles and the like, by means of the brake 45. It will of course be understood that the supply of electric energy to the energizing coils can be interrupted at will by any suitably positioned or operated switch, as, for example, by the usual switch in the lamp socket into which the plug 25 is screwed.

It will be observed from the foregoing description that I have provided a very simple and cheap electrically operated talking machine. The driving force of the motor is applied to the outer periphery of the rotatable support for the disk record, and the force necessary for driving the support is, accordingly, much smaller than if applied directly to the shaft of the support, since the lever arm at which a force applied to the outer periphery of the support acts is many times longer than in the case of a force applied directly to the shaft of the support. The motor may, therefore, be relatively smaller when its driving force is applied to the outer periphery of the support. In the particular embodiment of the invention which I have herein illustrated for explanatory purposes a single rotatable member serves both as the armature of the electric driving motor and as the record carrying medium. The electromagnetic motive means is of very simple construction, consisting only of bundles of laminations of magnetic material and of simple coils of wire. The electric current consumption is low, being in ordinary machines not more than about 30 watts, of which the greater part is consumed in the lamp. The use of the lamp as the non-inductive load for the induction motor element provides illumination of the machine, which is particularly convenient in changing records and needles. The speed regulation and brake for stopping the machine are of the type now well known to operators of spring-motor driven talking machines, and thus no operating difficulties are encountered in my improved electrically driven machine by the layman familiar with the operation of the spring-motor driven machines. Those skilled in the art will recognize that my invention may be embodied in various forms. I, accordingly, do not wish to be restricted to the specific construction herein illustrated and described, but aim in the appended claims to cover all modifications within the spirit and scope of my invention.

What I claim as new and desire to secure by Letters Patent of the United States, is:

1. An electrically operated talking machine comprising a rotatably mounted member having a flat circular horizontal surface for supporting a disk record and a continuous band of electrical conducting material depending from the periphery of such circular surface, a magnetic core member having an air gap through which said band is adapted to rotate, and magnetizing coils carried by said core member for producing a shifting magnetic field across said air gap.

2. An electrically operated talking machine comprising a rotatably mounted member having a flat horizontal surface for supporting a disk record, and a depending band of electrical conducting material, a magnetic core member having an air gap through which said band is adapted to rotate, an energizing coil mounted on said core member, a substantially non-inductive resistance, and another energizing coil mounted on said core member and connected in series relation with said resistance.

3. An electrically operated talking machine comprising a rotatably mounted member having a flat circular upper surface for supporting a disk record and a continuous band of electrical conducting material depending from the periphery of such circular surface, a magnetic core member having an air gap through which said band is adapted to rotate, an energizing coil mounted on said core member, a substantially non-inductive resistance, and another energizing coil mounted on said core member and connected in series relation with said resistance.

4. An electrically operated talking machine comprising a rotatably mounted member carrying an armature of electrical conducting material and provided with means for supporting a record, a magnetic core member having an air gap through which said armature is adapted to rotate, a magnetizing coil provided by said core member with two magnetic circuits for the flux developed therein one a substantially closed magnetic circuit of low reluctance and the other a magnetic circuit including said air gap and of relatively high reluctance, a second magnetizing coil provided by said magnetic core with a magnetic circuit including said air gap and of relatively high reluctance, and a non-inductive resistance connected in series with said second magnetizing coil.

5. An electrically operated talking machine comprising a rotatably mounted member carrying an armature of electrical conducting material and provided with means for supporting a record, a magnetic core member having an air gap through which said armature is adapted to rotate, an energizing coil mounted on said core member so that the greater portion of the flux developed by said coil has a substantially closed magnetic circuit, a substantially non-inductive resistance, and another energizing coil mounted on said core member and connected in series with said resistance and having small ohmic resistance as compared with said non-inductive resistance.

6. An electrically operated talking machine comprising a rotatably mounted member carrying an armature of electrical conducting material and provided with means for supporting a record, and electromagnetic means including a magnetic core member energizing coils and an incandescent lamp operatively related to said armature and forming therewith an electric motor of the induction motor type, said incandescent lamp being electrically connected in series with one of said coils and adapted to make the electric circuit of such coil substantially non-inductive.

7. An electrically operated talking machine comprising a rotatably mounted member carrying an armature of electrical conducting material and provided with means for supporting a record, and electromagnetic means including a magnetic core member energizing coils and an incandescent lamp operatively related to said armature and forming therewith an electric motor of the induction motor type, said incandescent lamp being adapted to provide said electromagnetic means with a substantially non-inductive load and being positioned to illuminate said rotatable member.

In witness whereof, I have hereunto set my hand this 12th day of May, 1915.

CHESTER I. HALL.